(12) United States Patent
Ryder

(10) Patent No.: US 6,216,728 B1
(45) Date of Patent: Apr. 17, 2001

(54) TUNABLE ANTICIPATORY OUTPUT RESPONSE VALVE CONTROL

(75) Inventor: Steven C. Ryder, Granby, CT (US)

(73) Assignee: CE Nuclear Power LLC, Windsor, CT (US)

(*) Notice: Subject to any disclaimer, the term of this patent is extended or adjusted under 35 U.S.C. 154(b) by 0 days.

(21) Appl. No.: 09/178,890

(22) Filed: Oct. 27, 1998

Related U.S. Application Data

(60) Provisional application No. 60/077,838, filed on Mar. 13, 1998.

(51) Int. Cl.[7] ............................................. F16K 31/12
(52) U.S. Cl. .................. 137/488; 137/486; 137/487.5; 376/245; 376/210; 376/211; 376/246; 376/247; 376/313
(58) Field of Search .................................... 137/486, 468, 137/601, 487.5, 488; 376/246, 247, 245, 210, 211, 313

(56) References Cited

U.S. PATENT DOCUMENTS

| | | | |
|---|---|---|---|
| 3,211,622 | * 10/1965 | Brown | 376/210 |
| 4,356,840 | * 11/1982 | Friedland et al. | 137/487.5 |
| 4,518,955 | * 5/1985 | Meyer | 340/605 |
| 4,735,231 | * 4/1988 | Jaquet | 137/459 |
| 5,129,418 | * 7/1992 | Shimomura et al. | |
| 5,139,044 | 8/1992 | Otten et al. | |
| 5,291,190 | * 3/1994 | Scarola et al. | 340/825.06 |
| 5,493,488 | * 2/1996 | Castle et al. | 364/162 |

FOREIGN PATENT DOCUMENTS 0 110 325 A1   6/1984   (EP).
0 576 819 A1   1/1994   (EP).

OTHER PUBLICATIONS

International Preliminary Examination Report of Dec. 10, 1999.

* cited by examiner

*Primary Examiner*—Charles T. Jordan
*Assistant Examiner*—John R. Richardson
(74) *Attorney, Agent, or Firm*—Henry T. Crenshaw, Jr.; Ronald P. Kananen; Rader, Fishman & Grauer

(57) ABSTRACT

A valve control apparatus for generating an anticipatory output response for controlling a fluid flow in a fluid flow line includes a valve provided inside the fluid flow line, at least one sensor for providing at least one input signal, said at least one input signal responsive to properties of said fluid flow in advance of said valve, and a letdown back-pressure controller receiving said at least one input signal and providing a tunable output signal for selectively opening and closing said valve to vary flow in the flow line responsive to said at least one input signal. A method for controlling fluid flow through a valve in a fluid flow line with an anticipatory output response according to the invention comprising the steps of measuring fluid flow properties in said fluid flow line in advance of said valve, providing at least one input signal responsive to properties of said fluid flow to a letdown back-pressure controller, processing said at least one input signal by said letdown back-pressure controller, generating a tunable output signal from said letdown back-pressure controller for selectively opening and closing said valve to vary flow in the flow line responsive to said at least one input signal, and tuning said output signal from said letdown back-pressure controller.

11 Claims, 3 Drawing Sheets

TUNABLE ANTICIPATORY OUTPUT RESPONSE VALVE CONTROL

CROSS-REFERENCE

This application claims priority to the U.S. Provisional Application Number 60/077,838, filed Mar. 13, 1998.

BACKGROUND OF THE INVENTION

The present invention relates to a valve control apparatus for generating an anticipatory output response for controlling a fluid flow in a fluid flow line and, more particularly, a valve control apparatus with a tunable anticipatory output response.

When changing a nuclear power plant configuration from a variable letdown/fixed charging chemical volume control system to a variable charging/fixed letdown control scheme, the letdown back-pressure controller is not able to control letdown back-pressure without employing the fluid flow line's relief system when a letdown orifice-type valve is opened under normal operating conditions. As the associated letdown orifice does not develop a pressure drop instantaneously, a transient pressure pulse passes through the letdown heat exchanger and associated piping to the letdown back-pressure valve because the response time associated with the instrumentation typically provided for a conventional proportional, integral, and derivative (PID) controller (approximately 300 ms plus valve response time at analog based, and 500 ms plus valve response time if microprocessor based) cannot change the output signal to the valve fast enough to overcome valve stiction and thereby control the transient pressure pulse without lifting the fluid flow line's relief.

SUMMARY OF THE INVENTION

A valve control apparatus including a letdown back-pressure controller including an anticipatory output response feature solves the transient pressure pulse problem by providing an anticipatory output response whenever opening of any one of the letdown orifice valves is initiated. More specifically, initiating a response in the letdown back-pressure controller lowers system pressure before and/or concurrent with the development of the transient pressure pulse to limit the peak system pressure during the transient condition to less than the system relief pressure. Further, specific hardware and software configurations interface with the letdown back-pressure controller address variations in system designs, including changes over time. Specifically, the anticipatory output response is tunable by a technician with a personal computer.

The valve control apparatus for generating an anticipatory output response for controlling a fluid flow in a fluid flow line in a variable charging/fixed letdown chemical volume control system for a nuclear power plant that includes a back-pressure valve provided inside the fluid flow line, multiple orifice valves fluidly connected to said back-pressure valve, a sensor disposed before the valve in the fluid flow line for providing an input signal in response to properties of the fluid flow at the multiple orifice valve, and a letdown back-pressure controller receiving the input signal and providing a tunable output signal for selectively opening and closing the back-pressure valve to vary pressure in the flow line. The tunable anticipatory output signal is generated by the letdown back-pressure controller in response to any of the external digital input signals. Once the transient pressure pulse passes, the letdown back-pressure controller reverts to a PID controller generating a typical output signal. Preferably, the letdown back-pressure controller includes a computer, whereby the anticipatory output signal can be tuned by an operator. The anticipatory output signal is tunable with respect to output magnitude and a decay time constant. The letdown back-pressure controller also includes an auto closure feature and a process alarm feature.

A method for controlling fluid flow through a valve in a fluid flow line with an anticipatory output response includes measuring fluid flow properties in the fluid flow line in advance of the back-pressure valve, providing an input signal responsive to the properties of the fluid flow to a letdown back-pressure controller, processing the input signal by the letdown back-pressure controller, generating a tunable output signal from the letdown back-pressure controller for selectively opening and closing the valve to vary flow in the flow line responsive to the input signal and tuning the PID output of the letdown back-pressure controller.

DESCRIPTION OF PREFERRED EMBODIMENTS

Figure 1:
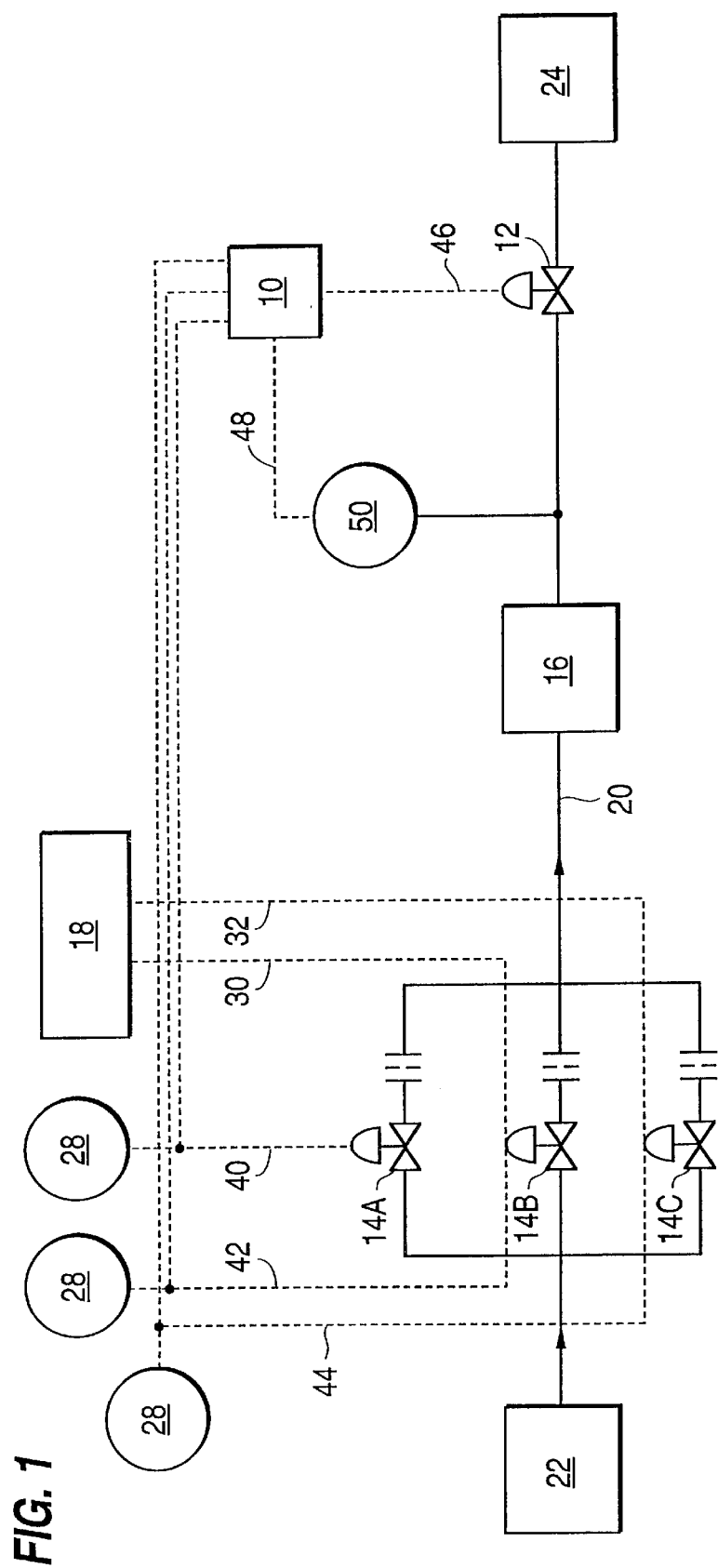
FIG. 1 is a variable charging/fixed letdown control scheme including a letdown back-pressure control valve controlled by a letdown back-pressure controller, which receives and responds to tunable anticipatory output bias according to the invention.

With reference to FIG. 1, a variable charging/fixed letdown control scheme for a chemical volume control system for a nuclear power plant includes a letdown back-pressure controller 10 for controlling a letdown back-pressure control valve 12, and multiple letdown orifice valves 14A–14C connected to the control valve 12 by fluid flow lines 20 through a heat exchanger 16. A pressurizer level control system 18 regulates the multiple letdown orifice valves 14A–14C via circuits 30, 32 for low and high level errors respectively. The fluid flow lines 20 connect a reactor coolant system 22 to a volume control tank 24. The letdown back-pressure controller 10 is connected via a circuits 40, 42, 44 to the multiple orifice valves 14A–14C respectively. Circuits 40, 42, 44 correspond to channels 110Z, 110Y, and 110X respectively, as referenced to in the software configuration below. Hand switches 28 are provided between each respective orifice valve 14A–14C and the controller 10, which processes signals indicating an open or close demand signal to one or more of the multiple orifice valves 14A–14C, and provides a tunable output signal on circuit 46, which is referenced as channel 201 in the software configuration below, for selectively opening and closing the back-pressure control valve 12 to vary pressure in the flow lines 20. A pressure sensor 50 is also fluidly connected to fluid flow lines 20, and is monitored by controller 10 via circuit 48. In summary, the tunable output signal is generated by the letdown back-pressure controller 10 in response to input signals from any of the valves 14A–14C.

Pressure in the fluid flow lines 20 is controlled through a letdown back-pressure control valve 12, as described above. The anticipatory output response also includes measuring fluid flow properties, such as pressure and temperatures in the fluid flowline 20 in advance of the back-pressure control valve 12, and providing an input signal responsive to the properties of the fluid flow to the letdown back-pressure controller 10. The controller 10 processes the input signal and generates a tunable ouput signal for selectively opening and closing the valve to vary flow in the flow line 20. Specifically, the output magnitude and decay time constant of the output signal can be tuned.

The letdown back-pressure controller 10 provides anticipatory output responses significantly faster than a conventional proximal, integral, and deriative (PID) controller. Specifically, the letdown back-pressure controller 10 lowers system pressure before or concurrent with the development of the transient pressure pulse and limits the peak system pressure during the transient condition to less than the system relief pressure. Because each system has its own characteristics and variables—such as specific valve structure, valve operator, and system response—the anticipatory output response must be tunable by a technician, and is preferably tunable with a personal computer.

Figure 2A:
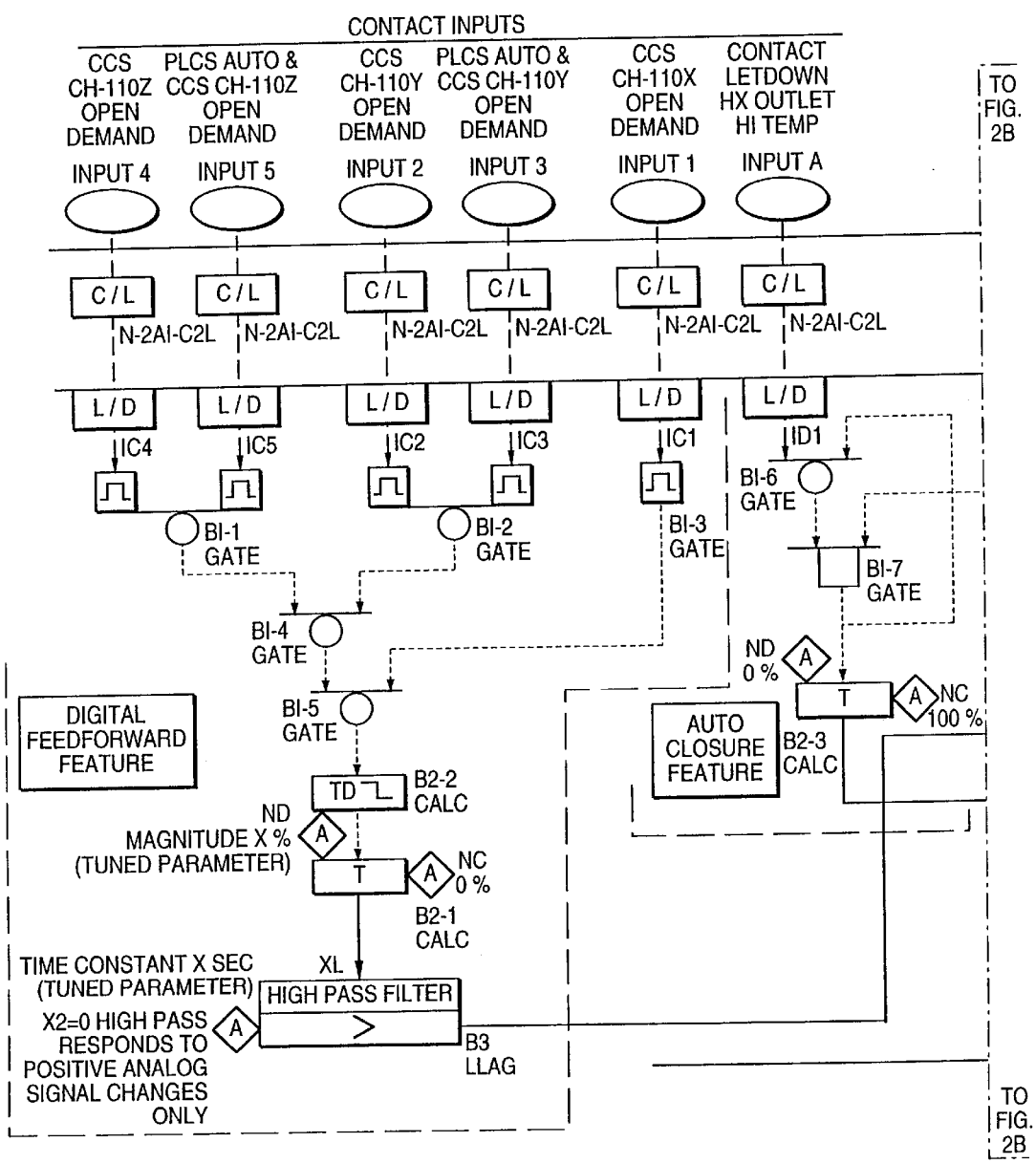
FIG. 2 is a functional diagram of the letdown back-pressure controller.
Figure 2B:
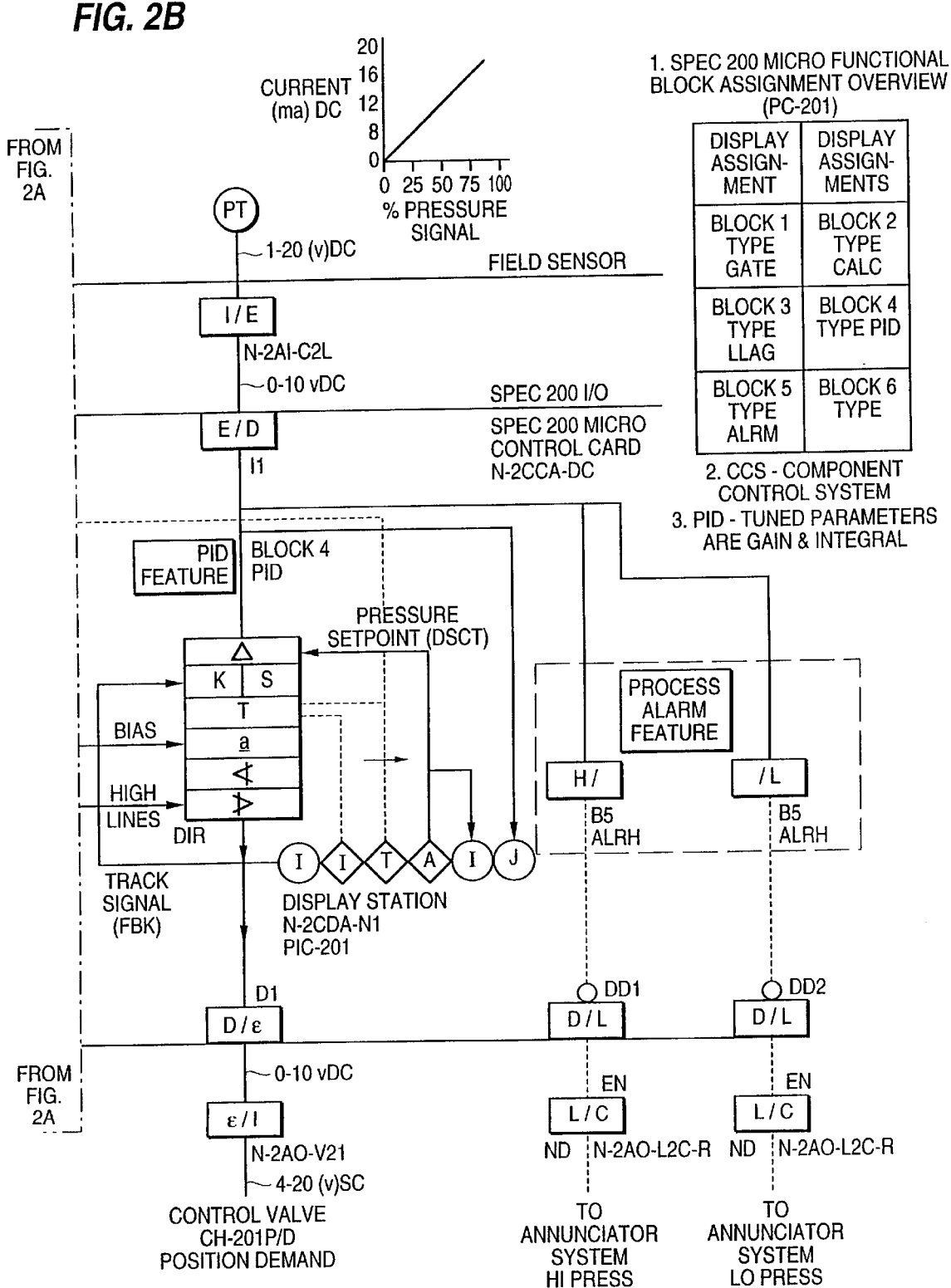

The letdown back-pressure controller 10 is preferably a Spec 200 MICRO® PID controller including a microprocessor running specifically designed software. FIG. 2 presents the features and functions implemented in the software/hardware configuration in a functional block diagram format using symbols for identification, and terms derived from ISA® standards ANSI/ISA-S5.1-1994 and ANS/ISA-S5.2-1996 (reaffirmed in 1991). The software running on the microprocessor of PID controller 10 is preferably SPEC 200 MICRO® software release SPC/S2M-AAA2*B version 2.1. Both the SPEC 200 MICRO® PID controller and SPEC 200 MICRO® software are available from The Foxboro Company.

The tunable anticipatory output response of the letdown back-pressure controller 10 includes digital and analog features implemented in the software configuration. The tunable anticipatory output response is labeled "Digital Feedforward Feature" as indicated in FIG. 2. The tunable anticipatory output response is a tunable output bias to "bump" open the control valve 12 when any one of five external digital inputs is enabled independent of the measured parameter at the valve. The "bump" then decays to allow the letdown back-pressure controller 10 to control and monitor the measured parameters after the pressure pulse passes.

The letdown back-pressure controller 10 also includes auto closure and process alarm features, both are which are labeled on FIG. 2. In the preferred embodiment, both features along with the digital feedforward feature, are incorporated into letdown back-pressure controller 10.

The following is a detailed description of the software configuration using SPEC 200 MICRO® terms in the various block labels with reference to FIG. 2. A more detailed description of the software configuration is included in U.S. Provisional Patent Application No. 60/077,838, which is hereby incorporated by reference.

Letdown Back-pressure Control is accomplished using one SPEC 200 MICRO Card (N-2CCA) and one display station (N-2CDA-N1). The Letdown Back-pressure Controller's output signal is converted from 0 to 10 vdc to a field current signal of 4 to 20 made by a N-2AO-V2I voltage to current converter.

The Letdown Back-pressure Control valves are closed automatically on a High-High Letdown H/S Output Temperature condition from Channel T-224. The controller receives a closed contact input signal from a N-2AI-C2L contact Input card for channel T-224 when a High-High temperature condition exists. A set of logic gates function to determine whether the input conditions for switching the High Output limit from the system designer's setting to a 0 percent value (closing the valve). The automatic closure functions when the controller is in AUTO. Once activated the close signal remains latched by the controller's Auto mode status. Switching the letdown Back-pressure controller to MAN mode resets the latch and allows the valve to be opened.

The Letdown Back-pressure control valves use a digital feedforward function to bump open the valves when an open demand signal is provided to CH-110X, Y, or Z from either an operator handswitch or the PLCS. The bump time and magnitude are set to open the valve when anticipated increases in pressure are expected that may challenge the operation of the letdown line relief valves. The feedforward function is set to prevent having significant transient responses due to process measurement delays or valve performance delays (i.e. valve stiction, etc.). The setting is also to have a minimal impact on the controller's overall performance to transients such that the system's performance is still within the responses required by the system designer.

The pressure input signal is also used to provide HIGH and LOW pressure absolute alarms. The SPEC 200 MICRO card provides a low logic output signal on alarm for each alarm condition. Each logic output is sent to a N-2AO-L2C-R Contact Output Card.

LETDOWN BACK-PRESSURE CONTROLLER

The Letdown Back-pressure controller generates a proportional plus integral output signal using a PID function based on its tuned settings. This output is for the control of the letdown back-pressure valves. The PID control function is direct acting (i.e. the output increases as the measurement increases). In AUTO, a positive only impulse function is applied as a BIAS to the PID output, when an independent open demand signal is received from CH110X Y, Z, or the either of the two Pressurizer Level Control system (PLCS) Level Error signals.

SETTING OUTPUT LIMITS (PC-201)

The Low Output Limit (LOLIM) is set at 0 percent. The High Output Limit (HOLIM) is set as a pointer to obtain an output value from a CALC block switch function. The HOLIM pointer applies a high limit value as selected by calculation from Block 2 Output 3 (B12 10). The AUTO CLOSURE functions incorporated into the high limit function.

LETDOWN BACK-PRESSURE ALARMS (HI/LO/B5/ALRM)

The Letdown Back-Pressure alarms are set as a digitally quantized percentage (PCT) of the input signal span. For example calculating the setting for a high absolute alarm at 35.20 KG/CM2, given the alarm's input signal range is 0 to 50.00 KG/CM2, is as follows:

High Alarm (HA)=35.20×100 PCT=70.4 PCT 50.00

Both absolute alarms use the same dead band (DB) value to determine the reset value for the alarm function. Typical settings for this alarm functions are as follows:

| Tuning Parameter | | Setting |
| --- | --- | --- |
| High Absolute Alarm (HA) | = | 70.4 |
| Low Absolute Alarm (LA) | = | 59.0 |
| Dead Band (DB) | = | 1.0 |

AUTO CLOSURE FUNCTION (B2–3/CALC)

The automatic closure function uses a switch function performed in a CALC block to change the controller's high output limit. When the input logic conditions (refer to truth table in section 5.6.4) are set to 0 {OPEN Contact sets Block 1 Gate 7 Logic value (LVB1–7) to 0}, the HIGH LIMIT is set to 100.0% SIGNAL as the result of the following calculation:

Block 2 Output 3 (S3 or B2 10)=0.0000–1.000*LVB1–7+1.000

B2 10=(0.0000–1.000)*0+1.000=1.000

CALC block operations OP3 and OP7 are used to set the HIGH LIMIT value, OP1 is set to CLOSE the valve. For the purposes of functional acceptance testing, OP3 and OP7 are set to 1.000 (or 100% SIGNAL).

When logic conditions are set to 1 (CLOSED contact sets Block 1 Gate 7 Logic value (LVB1–7) to 1), the HIGH LIMIT is set to 0.0% SIGNAL closing the valve as the result of the following calculation:

Block 2 Output 3 (S3 or B2 10)=0. 0000–1.000*LVB1–7+1.000

B2 10=(0.0000–1.000)* 1+1.000=0.000

AUTO CLOSURE LOGIC (B1/GATE)

Two gates are used to create the logic to identify and latch the auto closure signal. The auto closure signal closes the letdown back-pressure control valves.

The following truth table defines this function:

| T-224 HI HI Temp CONTACT STATUS | TC-224-2 N 2AI-C2L OUTPUT STATUS | PIC-201 A/M Mode Status | Signal to B2-3 CALC BLOCK Switch Function |
|---|---|---|---|
| 0 | 0 | 1 | 0 |
| 1 | 1 | 1 | 1 |
| 1–0 | 1–0 | 1 | 1 |
| X | X | 0 | 0 |
| 1 (Closed) = HI-HI Temp 0 (Open) = HI-HI Temp Clear X = either condition | 1 = HIGH Logic Level 0 = LOW Logic Level | MAN = 0 AUTO = 1 | (Auto Closure) B1 0607 = 1 (Output High Limit Setting) B1 0607 = 0 |

DIGITAL FEEDFORWARD LOGIC (B1/GATE)

Five gates are used to create the logic to identify an OPEN DEMAND signal from either the operator controls for the letdown orifice bypass valves (CH-110X, Y, or Z) or the PLCS open demand signals for CH-110Y and Z. An open demand signal from any one of the inputs is passed through the input's ONE SHOT and a series of OR gates to set a time delay OFF function. The time delay OFF function provides a short duration logic one that feeds a switch function. After the time delay, the logic is ready to accept another open demand signal from one of the other inputs.

| CH-110 X, Y, Z or PLCS CONTACT STATUS | N-2AI-C2L Output Status | Each Input through ONE shot | Time delay OFF | Signal to CALC Switch |
|---|---|---|---|---|
| 0 | 0 | 0 | 0 | 0 |
| 0–1 | 0–1 | 0–1 (one shot for scan cycle) | 0–1* (time delay OFF started) | 1 |
| 1 | 1–0 | 1–0 (one shot scan cycle expires) | 1* (for timed delay period) | 1 |
| X | X | 0 | 1–0* (timed cycle expires) | 0 |
| 1 (Closed) = HI-HI Temp 0 (Open) = HI-HI Temp Clear X = either condition | 1 = High Logic Level 0 = LOW Logic Level | | Timer Clock Cycle = 1* Timer Clock Cycle = 0 | |

*NOTE: timed cycle duration set by CALC Block.

TIME DELAY OFF

The CALC Block is used to extend a clock pulse for a defined duration. The CALC block output is contained in 13 bits of a 16 bit word. The time delay off function starts at the value 1.000 and counts down by a fixed value each clock cycle. After a predetermined number of clock cycles bit 5 changes from a 1 to a 0, ending the duration of the clock pulse.

The duration of the clock pulse is determined by the number of clock cycles it takes to process the digital inputs, gate logic, and process operations OP9 through OP13. For this feedforward function, the setting of operation OP13 is used to approximate this duration in seconds. The value assigned to OP13 should not be set lower than 5.000 and can be set to a maximum of 10.000. This range is provided to allow sufficient time to process 5 or more time constants for the signal decay of the impulse response (refer to section 5, 6, 8, for setting of the signal decay time). While this clock pulse is extended no additional open demand inputs are processed.

When a typical High Pass filter time constant is 0.78 seconds, ensuring that the duration of the time delay off exceeds at least 5 time constants for a signal decay, including the processing time for a few input clock cycles, {(0.78×5)+0.6=4.5 sec.} a value of 6.000 is used.

DIGITAL FEEDFORWARD ANALOG PULSE

The analog pulse for the digital feedforward function is generated using switch function performed by a CALC block. The pulse-changes from a value of 0.000 to some positive magnitude then back to zero based on the state of the logic value in Block 1 Gate 5 (LVB1–5), i.e. the switch. When LVB1–5=0 the pulse magnitude is set to 0.0% SIGNAL by the following calculation:

Block 2 Output 1 (S1 or B2 08)=0.1000–0.0000*LVB1–5+0.0000

B2 08=(0.1000–0.0000)*0+0.0000=0.0000

Operations OP19 is used to set the OUTPUT BIAS magnitude, OP21 and OP25 are set for NO BIAS (0%). For the purposes of functional acceptance testing, OP19 is set to 0.1000 (or a 10% SIGNAL, which is approximately a+1.5 mAdc bump in the output).

When the block 1 Gate 5 Logic value (LVB1–5)=1, the output bias is set to the bump magnitude value (10% SIGNAL). When the controller is in AUTO this will bump open the valve. The output bias value is determined as a result of the following calculation:

Block 2 Output 1 (S1 or B2 08)=0.1000–0.0000*LVB1–5+0.0000

B2 08=(0.1000–0.0000)*1+0.0000=0.1000

The OUTPUT BIAS magnitude value (OP19) provided in this example is set for 10%. This value is to be tuned by the designer's evaluation of this controller's performance during various system operating conditions and design transients.

HIGH PASS FILTER W/HIGH SELECT FUNCTION

The analog pulse generated by the switch function B2-1 is passed through a high pass filter with a positive only select function (IMPP=Y). The Laplace equivalent for this function is as follows:

$$\text{Block 3 Output(s)} = B2 - 1\,(s)\frac{T1S}{T1S} + 1$$

The time constant (T1) for the positive only impulse function (IMPP) is set as follows:

T1=0.78 sec. (0.013 min)

where T1 is the Lag Time Constant (LGTIM) in minutes.

The IMPP output (B3 08) is applied to Block 4's PID functions as the Tunable Anticipatory Output BIAS.

The PID controller 10 includes a tunable output bias response that is enabled by any 1 of 5 external digital inputs. Further, the tunable anticipatory output response has two tunable variables: (1) a tunable output magnitude (0–100%), and (2) a tunable decay time constant (5–10 seconds). Further, the tunable high limit is enabled by an external digital input.

The valve characteristics, including valve stiction, valve operator response time, valve trim, etc., as specified and supplied for an initially configured system change over time as the valve operates, which can result in undesirable system responses. The ability to tune the letdown back-pressure controller 10 provides the operator a method to compensate these differences without significantly reworking or replacing the valve. Thus, the operator compensates for the difference between the "as installed" characteristics of the valve and those with a used valve and its components.

Preferred embodiments of the present invention have been disclosed. A person of ordinary skill in the art will realize, however, that certain modifications and alternative forms will come within the teachings of this invention. Therefore, the following claims should be studied to determine the true scope and content of the invention.

What is claimed is:

1. A valve control apparatus generating an anticipatory output response for controlling a fluid flow in a fluid flow line, comprising:

a back-pressure control valve provided in fluid communication in the fluid flow line;

one or more orifice valves in fluid communuication in the fluid line upstream of said back-pressure control valve;

one or more signal channels providing one or more input signals for operating said one or more orifice valves; and a controller receiving said one or more input signals for operating said one or more orifice valves and providing an output signal to said back-pressure control valve for selectively opening and closing said back-pressure control valve to vary flow in the flow line in accordance with said one or more input signals for operating said one or more orifice valves.

2. A valve control apparatus according to claim 1 wherein said controller is a PID controller including a feedforward feature for generating said output signal.

3. A valve control apparatus according to claim 2 wherein said letdown back-pressure controller includes a computer, whereby said output signal can be tuned by an operator.

4. A valve control apparatus according to claim 3, wherein said tunable output signal includes a tunable output magnitude.

5. A valve control apparatus according to claim 4, wherein said tunable output magnitude is variable between 0 and 100 percent.

6. A valve control apparatus according to claim 3, wherein said tunable output signal includes a tunable decay time constant.

7. A valve control apparatus according to claim 6, wherein said tunable decay time constant is variable between 5 and 10 seconds.

8. A valve control apparatus according to claim 2, wherein said controller includes an autoclosure feature.

9. A valve control apparatus according to claim 2, wherein said controller includes a process alarm feature.

10. A valve control apparatus according to claim 1, wherein said valve is a back-pressure valve, further comprising:

one or more sensors positioned upstream of said back-pressure valve, said sensors being responsive to properties of said fluid flow and providing sensor signals to said controller.

11. A valve control apparatus according to claim 12, wherein said properties of said fluid flow include temperature and pressure.

* * * * *

UNITED STATES PATENT AND TRADEMARK OFFICE
CERTIFICATE OF CORRECTION

PATENT NO. : 6,216,728 B1
DATED : April 17, 2001
INVENTOR(S) : Steven C. Ryder

It is certified that error appears in the above-identified patent and that said Letters Patent is hereby corrected as shown below:

Column 8, claim 10,
Line 31, should read,
   10.    A valve control apparatus according to claim 1, further comprising:
one or more sensors positioned upstream of said back-pressure valve, said sensors being responsive to properties of said fluid flow and providing sensor signals to said controller.

Signed and Sealed this

Twentieth Day of November, 2001

Attest:

NICHOLAS P. GODICI
*Attesting Officer*     *Acting Director of the United States Patent and Trademark Office*